(12) United States Patent
Harrison et al.

(10) Patent No.: US 7,330,969 B2
(45) Date of Patent: Feb. 12, 2008

(54) METHOD AND APPARATUS FOR DATA VALIDATION

(75) Inventors: Keith Alexander Harrison, Woodcroft Chepstow (GB); Martin Sadler, Bristol (GB); Marco Casassa Mont, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 682 days.

(21) Appl. No.: 10/270,037

(22) Filed: Oct. 11, 2002

(65) Prior Publication Data

US 2003/0093674 A1    May 15, 2003

(30) Foreign Application Priority Data

Oct. 15, 2001   (GB)   ................. 0124670.1

(51) Int. Cl.
    *H04L 9/00*    (2006.01)
(52) U.S. Cl. .................................... 713/155
(58) Field of Classification Search ................ 380/265, 380/278, 44
    See application file for complete search history.

(56) References Cited

U.S. PATENT DOCUMENTS

| | | | | |
|---|---|---|---|---|
| 5,199,070 | A  * | 3/1993 | Matsuzaki et al. | 380/30 |
| 6,389,534 | B1   | 5/2002 | Elgamal et al. | 713/164 |
| 6,853,988 | B1 * | 2/2005 | Dickinson et al. | 705/75 |
| 6,895,507 | B1 * | 5/2005 | Teppler | 726/19 |
| 6,937,731 | B2   | 8/2005 | Chiu | 380/270 |
| 7,096,204 | B1 * | 8/2006 | Chen et al. | 705/74 |
| 2002/0010772 | A1* | 1/2002 | Kusano | 709/223 |
| 2002/0032312 | A1* | 3/2002 | Deo et al. | 530/387.3 |
| 2002/0172367 | A1 | 11/2002 | Mulder, et al. | 380/277 |
| 2003/0051129 | A1 | 3/2003 | Razdan et al. | 713/151 |
| 2004/0030652 | A1 | 2/2004 | Grunzig et al. | 705/51 |

FOREIGN PATENT DOCUMENTS

| | | |
|---|---|---|
| EP | 0 354 774 A2 | 2/1990 |
| EP | 0 723 348 A2 | 7/1996 |
| EP | 0 851 629 A2 | 7/1998 |
| EP | 1 043 862 A2 | 10/2000 |
| JP | 2001-244924 | 9/2000 |
| WO | 96/05674 A1 | 2/1996 |
| WO | 01/06697 A2 | 1/2001 |
| WO | 01/11527 A2 | 2/2001 |

OTHER PUBLICATIONS

Cocks, C., "An Identity Based Encryption Scheme based on Quadratic Residues," Communications—Electronics Security Group, PO Box 144, Cheltenham GL52 5UE (4 pages).
Boneh, D., et al., "Identity-Based Encryption from the Weil Pairing," (pages 1-30).
Krawczyk, H., "Secret Sharing Made Short", pp. 136-146, Springer Verlag (1998).
Menezes, A., et al., "Handbook of Applied Cryptography", Ch. 12, pp. 524-528 (1997).

* cited by examiner

*Primary Examiner*—Kambiz Zand
*Assistant Examiner*—Peter Poltorak
(74) *Attorney, Agent, or Firm*—Ladas & Parry LLP

(57) ABSTRACT

A method for encrypting data comprising deriving a public key using a first data set provided by a second party; encrypting a second data set with the public key; providing the encrypted third data set to the second party; providing the public key to a third party to allow validation of the first data set such that on validation of the first data set the third party provides an associated private key to the second party to allow decryption of the encrypted second data set.

9 Claims, 1 Drawing Sheet

METHOD AND APPARATUS FOR DATA VALIDATION

TECHNICAL FIELD

The present invention relates to a method and system for validating data.

BACKGROUND

As the use of the Internet has increased so, correspondingly, has the interest in the availability of services over the internet. However, to ensure that users are protected from fraudulent service providers it has been necessary to provide trust mechanisms to ensure that users are provided information to allow determination as to whether a service provider and accordingly the associated services and/or information relating to the services can be trusted.

However, mechanisms to establish a trusted relationship between two parties over the internet can be complex, for example the use of PKI infrastructure involves a trust authority vouching for a service provider, where a trust authority vouches for an independent service provider through the use of a digital certificate associated with a service provider that involves the issuing of an associated private and public keys to the service provider and a user respectively.

Additionally, encryption of data over communication links established between users on the internet is common. However, the encryption of data is used to ensure a certain level of confidentiality of the data and does not necessarily enhance the levels of trust between the users.

It is desirable to improve this situation.

SUMMARY OF THE INVENTION

In accordance with a first aspect of the present invention there is provided a method for validating data comprising receiving at a first party first data provided by a second party; encrypting second data supplied by the first party, this encrypting being effected by the first party using as encryption parameters both public data of a third party and a public key using the first data; providing the encrypted second data to the second party; providing the public key to the third party which checks the validity of the first data in the public key, and if the first data is valid, provides the second party with a private key for decrypting the encrypted second data, the third party generating the private key using the public key and private data related to said public data of the third party; decrypting the encrypted second data provided to the second party using the private key; and providing the decrypted second data from the second party to the first party, the first Party accepting the first data as validated by the third party if the second party has correctly decrypted the encrypted second data.

Preferably the second party is a service provider and the first data is a service criterion associated with the service provider.

Suitably the second data is a nonce.

Preferably the first data is provided via a web site associated with the second party.

Preferably the first data is a web page associated with the second party.

Suitably the public key further includes dynamic information.

Most suitably a plurality of second data sets are made available to allow the third party to categorize the use of public keys.

Suitably the third party is a trust authority.

Suitably the third party is a rating authority.

In accordance with a second aspect of the present invention there is provided a computer system comprising a first computer entity arranged to derive a public key using a first data and to encrypt second data using as encryption parameters both the public key and third-party public data;

a second computer entity arranged to make the first data available to the first computing entity and to receive the encrypted second data from the first computer entity; and a third computer entity arranged to receive the public key and on validation of the first data received in the public key, to provide an associated private key to the second computer entity to allow decryption of the encrypted second data set, the third computer entity being arranged to generate the private key in dependence both on private data related to said third-party public data, and on the public key In accordance with a third aspect of the present invention there is provided a computer apparatus a receiving arrangement for receiving a public key comprising data to be validated that has been obtained from a website associated with an entity;a validation arrangement for validating said data;a key generator for generating a private key in dependence both on private data and on the public key, the private key being operative to decrypt a message encrypted using the public key and public data related to the private data; and an outPut arranoement for outputting the private key to said entity only if the data is found to be valid.

BRIEF DESCRIPTION OF THE DRAWINGS

For a better understanding of the present invention and to understand how the same may be brought into effect reference will now be made, by way of example only, to the accompanying drawings, in which.

DETAILED DESCRIPTION OF PREFERRED EMBODIMENTS OF THE PRESENT INVENTION

Figure 1:
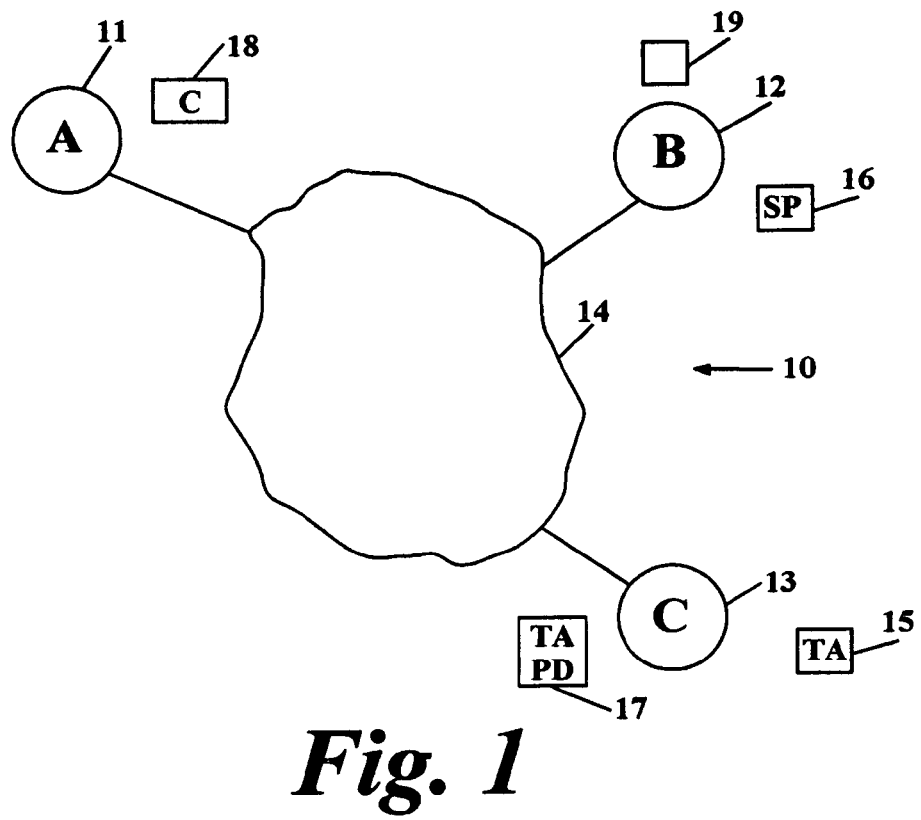
FIG. 1 illustrates a computer system according to an embodiment of the present invention.

FIG. 1 illustrates a computer system 10 according to an embodiment of the present invention. Computer system 10 includes a first computer entity 11, a second computer entity 12 and a third computer entity 13. Typically the three computer entities 11, 12, 13 would be configured on separate computer platforms, however the computer entities 11, 12, 13 could be configured on a single computer platform. For the purposes of this embodiment, however, the three computer entities 11, 12, 13 are coupled via the Internet 14.

Associated with the third computer entity 13 is a trust authority 15 for certifying the validity of information provided by a service provider 16 associated with the second computer entity 12. Alternatively, however, the trust authority 15 could act as a rating authority responsible for rating the performance of the service provider 16. Additionally, the trust authority 15 makes publicly available the trust authorities public data 17, as described below. As would be appreciated by a person skilled in the art the trust authorities public data can be made available in a variety of ways, for example via a public web site (not shown).

Associated with the first computer entity 11 is a potential customer 18 of the service provider 16.

The present invention allows the customer 18 to check the validity of information provided by the service provider 16

For the purposes of this embodiment validation of trust marks published by with the service provider 16 will be considered, however other types of information can also be validated.

Typically the service provider 16 electronically publishes information 19 relating to the services provided by the service provider including a trust mark associated with the trust authority 15 that provides some assurance to a potential customer that the service provider's 16 services meet a certain standard. The information 19 containing the trust mark can be published by any suitable means, for example via the service provider's website (not shown).

To allow the potential customer 18 to check the validity of the service provider's 16 assertions (i.e. that the available services meet a certain standard) the potential customer 18 forms the service provider's information 19, which could be part or all of a web page, into a representative digital string of data bits. This string (i.e. the customer's public key) is then used to encrypt a nonce (i.e. a random number) selected by the customer 18, as described below; however, data other than a nonce can be used. This forms the first step in the customer 18 challenging the service provider's 16 assertions.

The trust authorities public data 17 includes a hash function # and a value N that is a product of two random prime numbers p and q, where the values of p and q are only known to the trust authority.

The hash function # has the function of taking a string and returning a value in the range 0 to N. Additionally, the hash function # should have the jacobi characteristics: jacobi (#, N)=1. That is to say, where $x^2 \equiv \#$ mod N the jacobi (#, N)=−1 if x does not exist, and =1 if x does exist.

The values of p and q should ideally be in the range of $2^{511}$ and $2^{512}$ and should both satisfy the equation: $p,q \equiv 3$ mod 4. However, p and q must not have the same value.

To encrypt each bit M of the nonce the customer 18 generates random numbers $t_+$ (where $t_+$ is an integer in the range $[0, 2^N)$) until the customer 18 finds a value of $t_+$ that satisfies the equation jacobi($t_+$, N)=M, where M represents the individual binary digits 0, 1 of the user's data 15 as −1, 1 respectively. The customer 18 then computes the value:

$$s_+ = (t_+ + \#(publickeystring)/t_+) \mod N.$$

for each bit M where $s_+$ corresponds to the encrypted bit of M.

In case #(publickeystring) is non-square the customer 18 additionally generates additional random numbers $t_-$ (integers in the range $[0, 2^N)$) until the customer 18 finds one that satisfies the equation jacobi($t_-$, N)=m. The customer 18 then computes the value:

$$s_- = (t_- - \#(publickeystring)/t_-) \mod N$$

for each value of bit M.

The encrypted nonce is made available to the service provider 16 by any suitable means, for example via e-mail or by being placed in a electronic public area.

For the service provider 16 to recover the associated private key the service provider 16 needs to provide the public key, as used by the customer 18 to encrypt the nonce, to the trust authority 15 (i.e. the service information published by the service provider, including the trust mark that asserts the trust authority 15 has rated the services to a certain standard).

The trust authority 15 determines the associated private key B by solving the equation:

$$B^2 \equiv \#(publickeystring) \mod N$$

If a value of B does not exist, then there is a value of B that is satisfied by the equation:

$$B^2 \equiv -\#(publickeystring) \mod N$$

As N is a product of two prime numbers p, q it would be extremely difficult for any one to calculate the private key B with only knowledge of the public key string and N. However, as the trust authority 15 has knowledge of p and q (i.e. two prime numbers) it is relatively straightforward for the trust authority 15 to calculate B.

Any change to the public key will result in a private key that will not decrypt the nonce correctly. Therefore, the service provider 16 cannot alter the published information that is supplied to the trust authority 15 and still decrypt the encrypted nonce and therefore cannot alter the trust mark that is included in the information.

On receipt of the public key, the trust authority 15 checks whether the associated trust mark corresponds with the rating that the trust authority 15 has allocated to the service provider 16. If the trust authority 15 is satisfied that the trust mark is correct the private key B is supplied to the service provider 16 together with some indication of whether the public key is positive or negative.

If the square root of the encryption key returns a positive value, the customers data M can be recovered using:

$$M = jacobi(s_+ + 2B, N).$$

If the square root of the encryption key returns a negative value, the customer's data M can be recovered using:

$$M = jacobi(s_- + 2B, N).$$

The service provider 16 then uses the appropriate equation above, in conjunction with the private key, to decrypt the message.

The service provider 16 can retrieve the private key offline from the customers challenger or online during the customers challenge.

Figure 2:
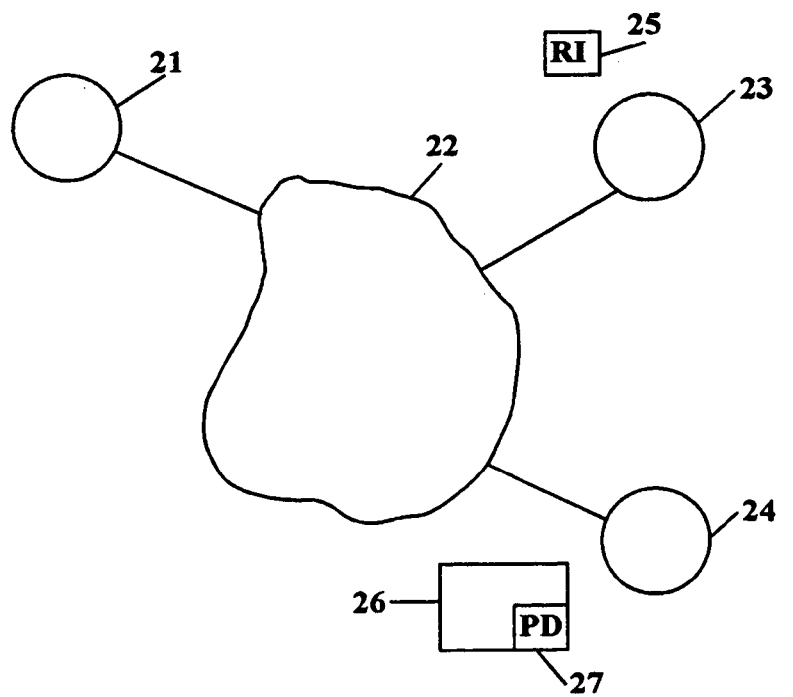
FIG. 2 illustrates a computer system arranged to implement a restaurant validation scheme according to an embodiment of the present invention.

On decryption of the nonce the service provider 16 can send the decrypted nonce back to the customer 18, thereby assuring the customer that the trust authority 15 has validated the trust mark used by the service provider 16 (i.e. the customer's challenge has been successful). Correspondingly, if the public key information has been altered or the service provider 16 is incorrectly using a trust mark the service provider 16 will be unable to decrypt the nonce and the customer's challenge will be unsuccessful FIG. 2 illustrates the use of the present invention for the purposes of a customer 21 validating the rating of a restaurant 23, where a restaurant 23 has a web page (not shown) on the Internet 22 containing, inter alia, a rating icon 25 issued by a trust authority 24 acting as a rating authority. The rating icon 25 indicates the rating that the trust authority 24 has given the restaurant 23, for example three stars. The restaurant 23 would typically choose the trust authority 24 because it is a trust authority that is respected and acknowledged by potential customers.

Initially the customer 21 obtains a software plug-in 26 from the trust authority's web site (not shown). The plug-in 26 is installed within the customer's web browser (not shown). The plug-in 26 embeds knowledge regarding the trust authorities public details N, #27.

The plug-in 26 is arranged to calculate a public key for the customer 21 in accordance with the above equations using information associated to a web page (not shown) of the restaurant 23 and to use a generated public key to encrypt a randomly generated nonce. The encrypted nonce is then provided to the restaurant 23.

During the set-up phase, the restaurant 23 requests the trust authority 24 to certify its web page (not shown), containing a three stars rating icon 25 and other relevant information, for example the restaurants address and phone number.

In this embodiment the trust authority 24 defines what information should be used to derive a public key from the relevant web page. For example, the public key could be a string obtained by combining relevant parts of the web page (for example address and phone numbers), the rating icon 25 and other meta-information (for example the web page url). The algorithm used to determine which part of a web page to use to calculate the corresponding public key is implemented in the plug-in 26 downloaded by customer 21 from the trust authority 24.

If the trust authority 24 verifies that the content of the public key is correct (i.e. the web page information is valid) the trust authority 24 issues a private key, that corresponds to the web page, to the restaurant 23.

On receipt of the private key the restaurant 23 can decrypt the potential customer's nonce and transmit the decrypted value to the potential customer 21, thereby confirming that the trust authority 24 has validated the service providers web page information.

Attention should be paid to the kind of information the trust authority 27 has to certify. For example, current web pages could have dynamic content (e.g. advertisement banners) that change at each download, thereby requiring a unique private key for each download.

The trust authority 24 can decide which static (invariant) information is to be certified by using special tags in the HTML page. Only the information flagged with these special tags should be used to create the public key.

Icons and pictures can be part of this public key. For example, the content of these images could be loaded and hashed in a deterministic way.

When required, such as in cases of web input forms, meta-information, including the web page URL and time can be used to generate the public key.

The public key derived from a web page could be made dependent on dynamic information, for example time. In this case the certification of a web page (i.e. the private key being issued to the restaurant 23 by the trusted authority 24) must be done every time a consumer 21 challenges the service provider's 23 information. This will directly involve the trust authority 24 in the challenge loop: this allows the trust authority 24 to accumulate evidence about misbehaviour both of certified and fake service providers. This will also prevent situations involving misuses of the schema.

Additionally, the use of dynamic information will prevent the use of inaccurate information that was valid at the time of initial certification from being used fraudulently.

Additionally, the trust authority 24 could have multiple public details. For example each "public detail" could be associated to a particular class of consumers. A consumer could be aware just of a subset of these public details.

This could allow the trust authority 24 to gather detailed information about categories of users of its service.

What is claimed is:

1. A computer system comprising:
   a first computer entity arranged to derive a public key using first data and to encrypt second data using as encryption parameters both the public key and third-party public data;
   a second computer entity arranged to make the first data available to the first computing entity and to receive the encrypted second data from the first computer entity; and
   a third computer entity arranged to receive the public key and on validation of the first data received in the public key, to generate an associated private key, and to provide said associated private key to the second computer entity to allow decryption of the encrypted second data, the third computer entity being arranged to generate the private key in dependence both on private data related to said third-party public data, and on the public key.

2. A data validation method comprising:
   receiving at a first party first data provided by a second party;
   encrypting second data supplied by the first party, this encrypting being effected by the first party using as encryption parameters both public data of a third party and a public key comprising said first data;
   providing the encrypted second data to the second party;
   providing the public key to the third party which checks the validity of the first data in the public key, and after validating the first data, providing the second party with a private key for decrypting the encrypted second data, the third party generating the private key using the public key and private data related to said public data of the third party; and
   decrypting the encrypted second data provided to the second party using the private key.

3. A method according to claim 2, wherein the second data is a nonce.

4. A method according to claim 2, wherein the first data is provided to the first party via a web site associated with the second party.

5. A method according to claim 2, wherein the first data is a web page associated with the second party.

6. A method according to claim 2, wherein the public key further comprises dynamic information.

7. A method according to claim 2 wherein the public key is provided to the third party by the second party.

8. A method according to claim 2 providing the decrypted second data from the second party to the first party, decryption of the encrypted second data causing the first party to accept the first data as validated by the third party.

9. A method according to claim 2 providing the decrypted second data from the second party to the first party, correct decryption of the encrypted second data causing the first party to accept the first data as validated by the third party.

* * * * *